United States Patent
Zhang et al.

(10) Patent No.: US 11,545,896 B1
(45) Date of Patent: Jan. 3, 2023

(54) POWER SUPPLY CONVERSION STRUCTURE AND ELECTRONIC DEVICE INCLUDING THE SAME

(71) Applicant: NuVolta Technologies (Hefei) Co., Ltd., Hefei (CN)

(72) Inventors: Junhe Zhang, Shanghai (CN); Fuchun Zhan, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 0 days.

(21) Appl. No.: 17/662,864

(22) Filed: May 11, 2022

(30) Foreign Application Priority Data

Feb. 5, 2022 (CN) .......................... 202210115189.3

(51) Int. Cl.
*H02J 7/00* (2006.01)
*H02M 3/07* (2006.01)
*H02M 1/10* (2006.01)

(52) U.S. Cl.
CPC ............... *H02M 3/07* (2013.01); *H02J 7/007* (2013.01); *H02J 2207/20* (2020.01)

(58) Field of Classification Search
CPC .. H02M 3/07; H02M 1/10; H02J 7/007; H02J 2207/20; H02J 7/00
USPC ....................................................... 320/140
See application file for complete search history.

(56) References Cited

U.S. PATENT DOCUMENTS

| | | | |
|---|---|---|---|
| 8,830,073 B2* | 9/2014 | Sims ..................... | G06F 1/3203 713/340 |
| 10,530,256 B1* | 1/2020 | Jayaraman .......... | H02M 3/1584 |
| 11,233,390 B2* | 1/2022 | Schaevitz ............. | H02M 3/156 |
| 2008/0158915 A1* | 7/2008 | Williams ............. | H02M 3/1588 363/21.06 |
| 2011/0211717 A1* | 9/2011 | Hoevesteen ......... | H04R 25/505 381/323 |
| 2017/0179715 A1* | 6/2017 | Huang .................. | H02M 3/155 |
| 2018/0115157 A1* | 4/2018 | Chan ....................... | H02J 7/342 |
| 2018/0123451 A1* | 5/2018 | Larsen ..................... | H02M 1/14 |
| 2018/0323624 A1* | 11/2018 | Chang ........................ | H02J 7/06 |
| 2020/0335982 A1* | 10/2020 | Lopez ................... | H02J 7/0024 |
| 2021/0273561 A1* | 9/2021 | Low ...................... | H02M 3/073 |

FOREIGN PATENT DOCUMENTS

CN 109787318 A 5/2019
CN 112928800 A 6/2021

* cited by examiner

*Primary Examiner* — Richard Isla
*Assistant Examiner* — Dung V Bui
(74) *Attorney, Agent, or Firm* — Slater Matsil, LLP

(57) ABSTRACT

A power supply conversion structure and an electronic device including the same are provided. By providing a voltage regulating module connected to a switched capacitor converter, the voltage regulating module receives a first voltage of the switched capacitor converter and converts the first voltage into a second voltage, and the second voltage is higher than a voltage of a current battery, so that in the use process of the electronic device, if a voltage output to a load of the electronic device is reduced below a threshold voltage, the voltage output to the load of the electronic device is boosted to be higher than the voltage of the current battery, thus avoiding bad customer experience such as black screen and even shutdown of the electronic device. As the switched capacitor converter and the voltage regulating module operate cooperatively, the number of switches can be reduced.

17 Claims, 14 Drawing Sheets

POWER SUPPLY CONVERSION STRUCTURE AND ELECTRONIC DEVICE INCLUDING THE SAME

PRIORITY CLAIM

This application claims the benefit of and priority to Chinese patent Application No. 202210115189.3, filed on Feb. 5, 2022, which is hereby incorporated by reference in its entirety.

TECHNICAL FIELD

The present invention relates to the field of power supplies, in particular a power supply conversion structure and an electronic device including the power supply conversion structure.

BACKGROUND

As technology continues to advance, various electronic devices, such as portable devices (including cell phones, tablet computers, digital cameras, MP3 players and/or other similar electronic devices) have become popular. Each electronic device may employ a plurality of chargeable battery units connected in series and/or in parallel to form a chargeable battery for storing electric energy. The chargeable battery can be charged by an adapter connected to the electronic device and the power supply conversion structure in the electronic device, thus recovering the energy of the battery, and the chargeable battery may be various types of batteries such as Li-ion batteries.

In the use process of the electronic device, it is expected that the electronic device can operate stably and reliably so as to improve the customer experience. However, as the electronic device is usually used in various harsh environments or harsh states, such as under the conditions of extremely low temperature or low voltage of the battery for power supply and the like. If the electronic device operates at the moment, such as photographing, the voltage output to the load of the electronic device can be rapidly reduced, and when the voltage output to the load of the electronic device is reduced to the threshold voltage, the bad experience such as a black screen even the shutdown of the electronic device may be brought to the customers. The load here is the power consumption unit of the electronic device. That is, the power supply conversion structure in the electronic device at present cannot guarantee the stable and reliable operation of the electronic device, or the high cost and large size of the power supply conversion structure is contrary to the development trend of miniaturization, low cost and high efficiency of the power supply converter.

SUMMARY

A power supply conversion structure is provided by the present invention, including a switched capacitor converter which comprises at least one switch, a power supply output terminal, and a first output terminal, wherein the switched capacitor converter is configured to convert a voltage of a battery connected to the power supply output terminal of the switched capacitor converter into a first voltage, and the first voltage is output from the first output terminal of the switched capacitor converter, a voltage regulating module which comprises at least one switch, an input terminal, and an output terminal, wherein the input terminal of the voltage regulating module is connected to the first output terminal of the switched capacitor converter and is configured to receive the first voltage and converting the first voltage into a second voltage, and the second voltage is output from the output terminal of the voltage regulating module, and a controller connected to the switched capacitor converter and the voltage regulating module and configured to control the switches in the switched capacitor converter and the voltage regulating module, wherein in a process that the battery connected to the power supply output terminal of the switched capacitor converter supplies power to a load connected to the output terminal of the voltage regulating module, in response to that a voltage received by the load connected to the output terminal of the voltage regulating module is reduced below a threshold voltage, the controller controls the switched capacitor converter and the voltage regulating module to convert the first voltage to the second voltage, and wherein the second voltage is higher than the voltage of the battery connected to the power supply output terminal of the switched capacitor converter.

An electronic device is further provided by the present invention, comprising the power supply conversion structure, the battery, wherein the first terminal of the battery is connected to the power supply output terminal of the switched capacitor converter, and the second terminal of the battery is grounded, and the load, wherein the load is connected to the output terminal of the voltage regulating module.

DETAILED DESCRIPTION OF ILLUSTRATIVE EMBODIMENTS

The following describes the technical solutions in the present invention with reference to the accompanying drawings clearly and completely. Apparently, the described embodiments are merely a part rather than all of the embodiments of the present invention. All other embodiments obtained by those of ordinary skill in the art based on the embodiments of the present invention without creative efforts shall fall within the scope of protection of the present invention.

Figure 1:
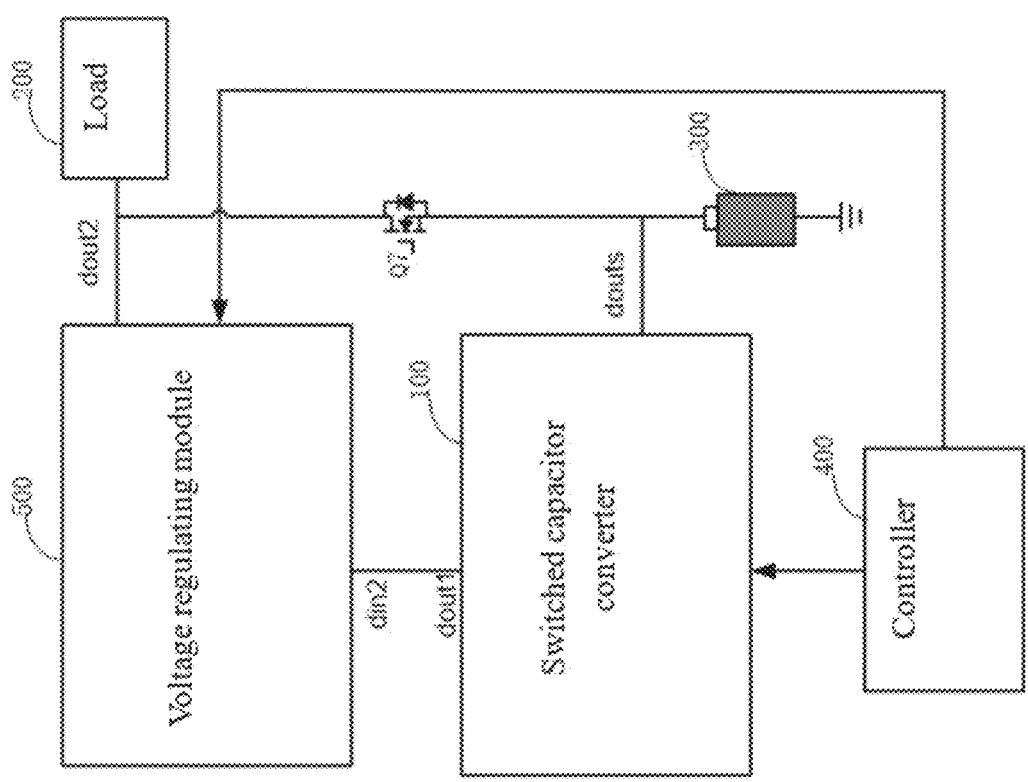
FIG. 1 is a schematic diagram of a power supply conversion structure of an embodiment of the present invention.

In an embodiment of the present invention, a power supply conversion structure is provided, which can be applied to an electronic device, specifically, please referring to a schematic diagram of a power supply conversion structure of an embodiment of the present invention shown in FIG. 1. The power supply conversion structure comprises a switched capacitor converter 100, a voltage regulating module 500, and a controller 400. The switched capacitor converter 100 comprises at least one switch, a power supply output terminal douts, and a first output terminal dout1. The switched capacitor converter 100 is configured to convert a voltage of a battery 300 connected to the power supply output terminal douts of the switched capacitor converter 100 into a first voltage V1, and the first voltage V1 is output from the first output terminal dout1 of the switched capacitor converter 100. The voltage regulating module 500 at least comprises a switch, an input terminal din2 and an output terminal dout2. The input terminal din2 of the voltage regulating module 500 is connected to the first output terminal dout1 of the switched capacitor converter 100 and is configured to receive the first voltage V1 and convert the first voltage V1 to a second voltage V2, and the second voltage V2 is output from the output terminal dout2 of the voltage regulating module 500. The controller 400 is connected to the switched capacitor converter 100 and the voltage regulating module 500, and is configured to control the switches in the switched capacitor converter 100 and the voltage regulating module 500. In response to that a voltage received by a load 200 connected to the output terminal dout2 of the voltage regulating module 500 is reduced below a threshold voltage, the controller 400 controls the switched capacitor converter 100 and the voltage regulating module 500 to convert the first voltage V1 to the second voltage V2. The second voltage V2 is higher than the voltage of the battery 300 connected to the power supply output terminal douts of the switched capacitor converter 100.

Therefore, in the use process of the electronic device, if the voltage output to the load of the electronic device is reduced below a threshold voltage, the controller 400 controls the switched capacitor converter 100 and the voltage regulating module 500 of the power supply conversion structure in the electronic device to operate cooperatively to increase the voltage output to the load of the electronic device, thus avoiding bad customer experience such as black screen and even shutdown of the electronic device. Moreover, as the switched capacitor converter 100 and the voltage regulating module 500 operate cooperatively, the number of switches can be reduced, so that the power supply conversion structure provided by the present application is small in size and low in cost.

Figure 2:
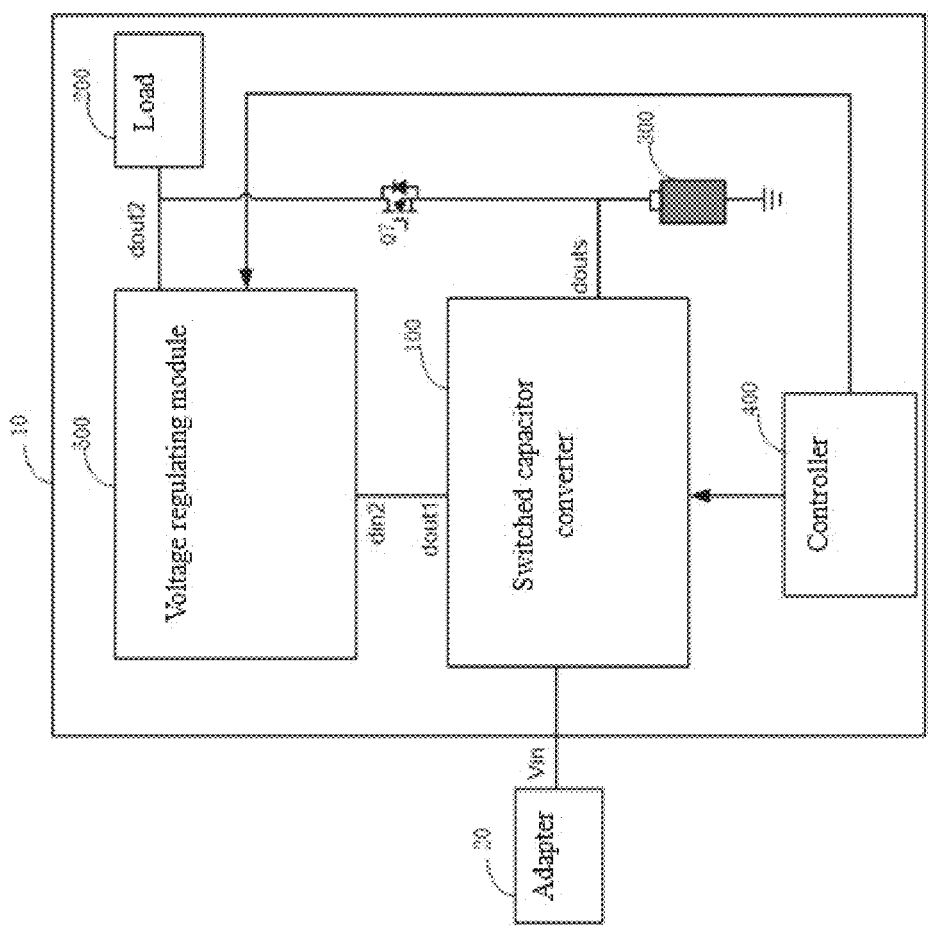
FIG. 2 is a schematic diagram of a power supply conversion system of an embodiment of the present invention.

In practice application, the electronic device is usually in one of the following two states. In the first state, the battery 300 needs to be charged, and the switched capacitor converter 100 receives an input voltage Vin at the moment. Specifically, FIG. 2 shows a schematic diagram of a power conversion system of an embodiment of the present invention. As shown in FIG. 2, the electronic device 10 is connected to an external power supply through an adapter 20, and the power supply conversion structure can charge the battery 300 as well as supply power to the load 200 at the moment. In the second state, the battery 300 does not need to be charged. The switched capacitor converter 100 does not receive an input voltage or the input voltage is equal to 0 V. For example, the adapter 20 is unplugged from the electronic device 10. The battery 300 connected to the power supply output terminal douts of the switched capacitor converter 100 supplies power to the load 200 connected to the output terminal dout2 of the voltage regulating module 500 at the moment. Under such a state, when the electronic device is in a harsh environment or harsh state, the voltage output to the load is likely to drop rapidly, thereby bringing bad experience to customers. As above, in response to that the voltage received by the load 200 connected to the output terminal dout2 of the voltage regulating module 500 is reduced below the threshold voltage, the controller 400 controls the switched capacitor converter 100 and the voltage regulating module 500 to convert the first voltage V1 to the second voltage V2, and the second voltage V2 is higher than the voltage of the battery 300 connected to the power supply output terminal douts of the switched capacitor converter 100. That is, in response to that the voltage received by the load 200 connected to the output terminal dout2 of the voltage regulating module 500 is reduced below the threshold voltage, the controller 400 controls the switched capacitor converter 100 and the voltage regulating module 500 such that: in the process that the battery 300 connected to the power supply output terminal douts of the switched capacitor converter 100 supplies power to the load 200 connected to the output terminal dout2 of the voltage regulating module 500, in response to that the voltage received by the load 200 connected to the output terminal dout2 of the voltage regulating module 500 is reduced below the threshold voltage, the controller 400 controls the switched capacitor converter 100 and the voltage regulating module 500 to operate so that stable and reliable operation of the electronic device without an external power supply is guaranteed.

In an embodiment of the present invention, the threshold voltage is greater than or equal to 3.3V, and less than or equal to 3.8V. Preferably, the threshold voltage is 3.6V. The threshold voltage can be properly adjusted according to different electronic devices.

In an embodiment of the present invention, the switched capacitor converter 100 can be any switched power converter as long as the voltage at the input terminal of the switched capacitor converter can be converted to the voltage at the output terminal of the switched capacitor converter. In an embodiment of the present invention, the switched capacitor converter 100 is a charge pump converter, so the power and efficiency of the switched capacitor converter 100 can be guaranteed.

Figure 3:
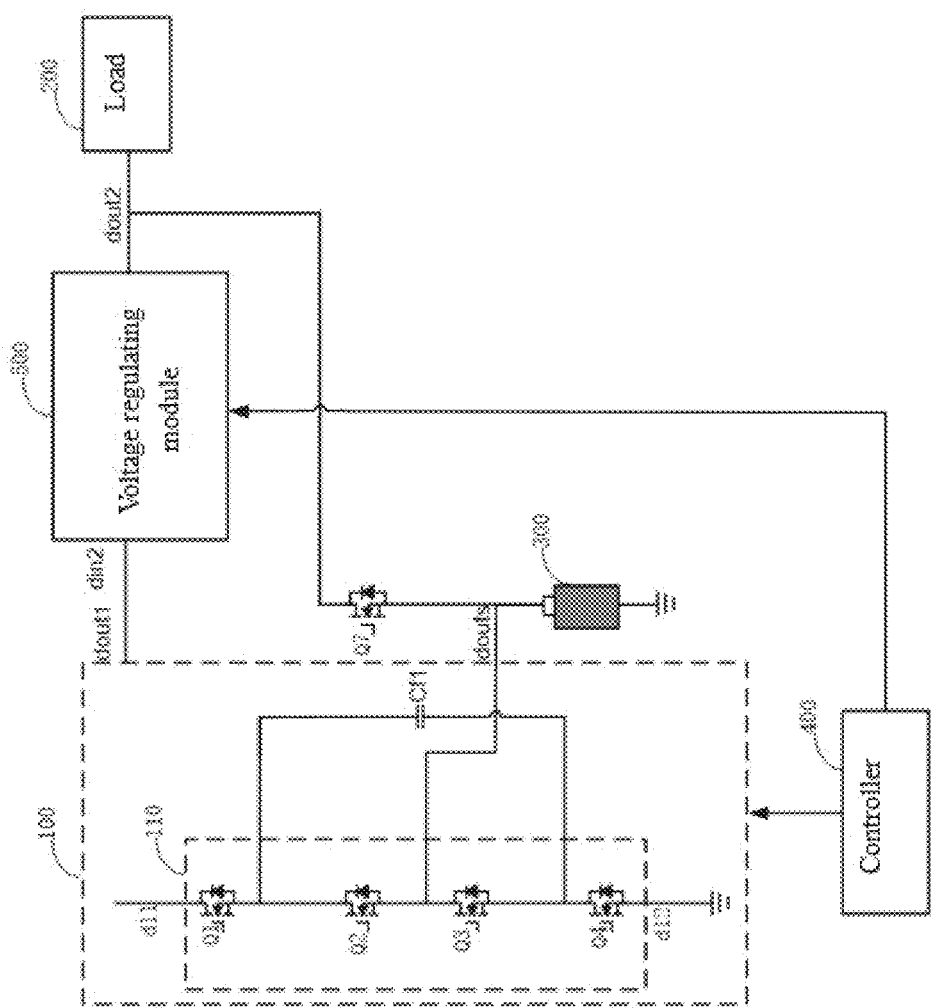
FIG. 3 is a schematic diagram of a circuit of a power supply conversion structure of an embodiment of the present invention.

In an embodiment of the present invention, please refer to a schematic diagram of a circuit of a power supply conversion structure of an embodiment of the present invention shown in FIG. 3. The switched capacitor converter 100 comprises a first switch series branch 110 and a first flying capacitor Cf1. The first switch series branch 110 comprises a first switch Q1, a second switch Q2, a third switch Q3 and a fourth switch Q4 connected in series. A first terminal of the first switch Q1 forms a first terminal d11 of the first switch series branch 110, and a second terminal of the fourth switch Q4 forms a second terminal d12 of the first switch series branch 110. The second terminal d12 is grounded. A common node of the first switch Q1 and the second switch Q2 is connected to a first terminal of the first flying capacitor Cf1. A common node of the third switch Q3 and the fourth switch Q4 is connected to a second terminal of the first flying capacitor Cf1, and a common node of the second switch Q2 and the third switch Q3 is configured to be connected to the power supply output terminal douts of the switched capacitor converter 100, so that the power and efficiency of the switched capacitor converter 100 is guaranteed.

Figure 4:
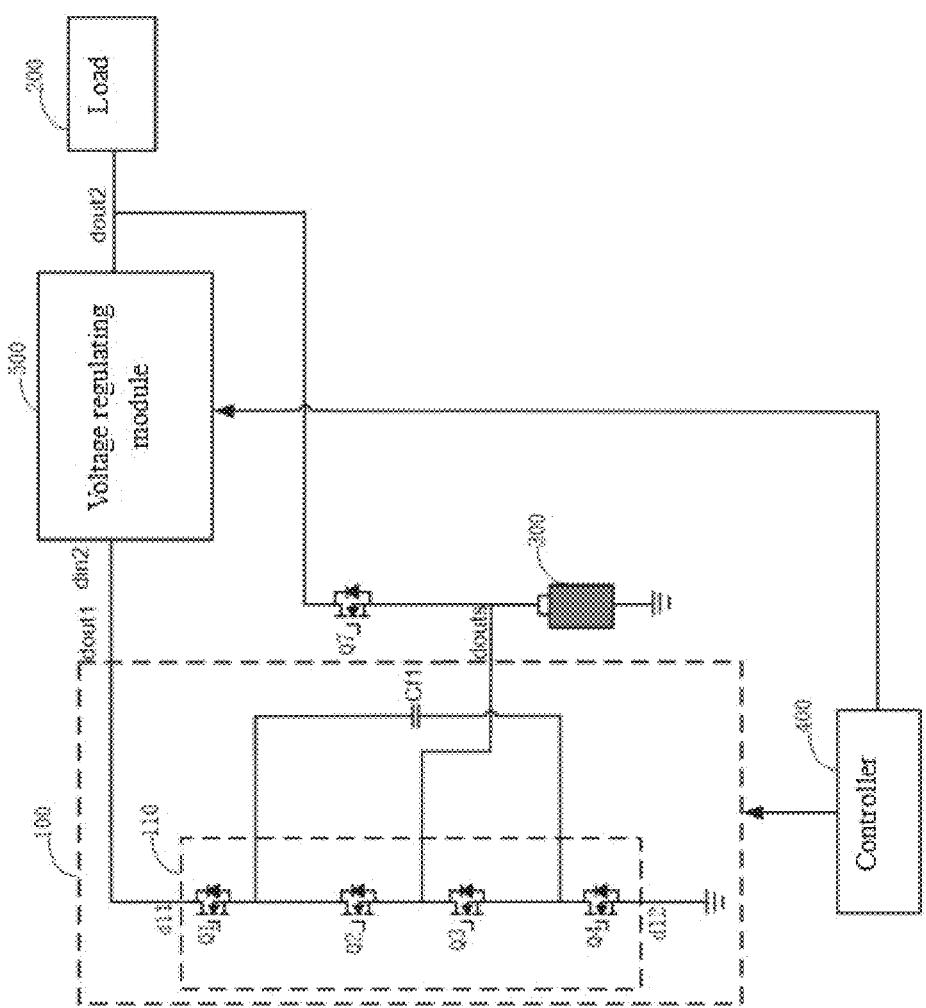
FIG. 4 is a schematic diagram of a circuit of a power supply conversion structure of another embodiment of the present invention.

Further, in an embodiment of the present invention, please refer to a schematic diagram of a circuit of a power supply conversion structure of another embodiment of the present invention shown in FIG. 4. The first terminal d11 of the switch series branch 110 forms the first output terminal dout1 of the switched capacitor converter 100, and the input terminal din2 of the voltage regulating module 500 is connected to the first terminal d11 of the first switch series branch 110. The first terminal d11 of the first switch series branch 110 provides the first voltage V1.

Figure 5:
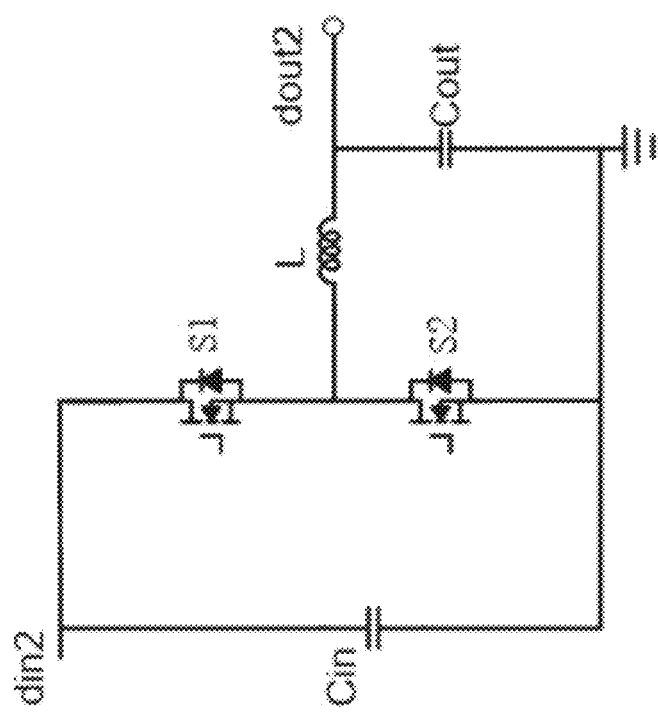
FIG. 5 shows a typical buck converter.
Figure 6:
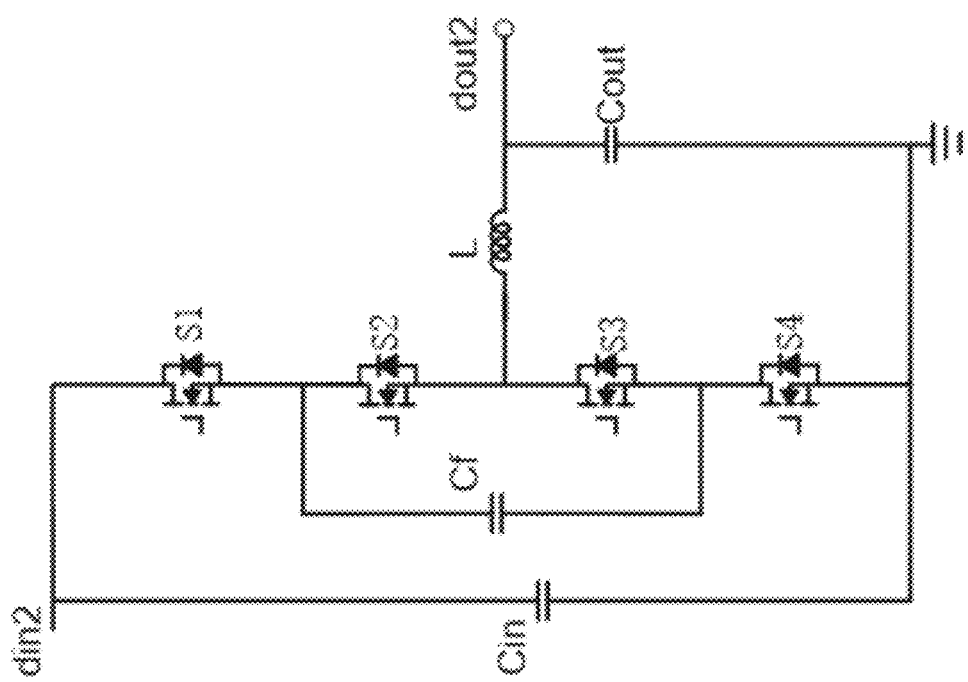
FIG. 6 shows a typical three-level buck converter.

Further, in an embodiment of the present invention, the voltage regulating module 500 in the power supply conversion structure shown in FIG. 4 is a buck converter. Further, in response to that the voltage received by the load 200 connected to the output terminal dout2 of the voltage regulating module 500 is reduced below the threshold voltage, the controller 400 controls the switched capacitor converter 100 such that: in response to that the voltage received by the load 200 connected to the output terminal dout2 of the voltage regulating module 500 is reduced below the threshold voltage, the controller 400 controls the switched capacitor converter 100 to operate in a charge pump mode in which a ratio of a voltage at the first terminal d11 of the first switch series branch 110 to a voltage at the power supply output terminal douts is N:1. N is an integer greater than or equal to 2. Therefore, when the controller 400 controls the switched capacitor converter 100 to operate, the first voltage V1 is N times of the voltage of the battery 300. A voltage received by the input terminal din2 of the buck converter is N times the voltage of the battery 300. The buck converter operates to step down and regulate the N times the voltage of the battery 300, so that the voltage output from the output terminal dout2 of the voltage regulating module 500 is higher than the voltage of the battery 300 at the moment, and the voltage received by the load 200 is boosted to be higher than the voltage of the battery 300 from the voltage of the battery 300. The voltage received by the load 200 is adjusted back to guarantee that the voltage received by the load of the electronic device is high enough, thus avoiding bad customer experience such as black screen and even shutdown of the electronic device. Further, the voltage regulating module 500 in FIG. 4 is a typical buck converter shown in FIG. 5 or a typical three-level buck converter shown in FIG. 6. Both the typical buck converter and the typical three-level buck converter are inductor-based buck converters and are widely used in the power supply conversion structures. In FIG. 5, a switch S1, a switch S2, an inductor L, an input-side capacitor Cin and an output-side capacitor Cout form the typical buck converter. In FIG. 6, a switch S1, a switch S2, a switch S3, a switch S4, an inductor L, a flying capacitor Cf, an input-side capacitor Cin and an output-side capacitor Cout form the typical three-level buck converter. The specific structure of the buck converter is not limited by the present invention, as long as the voltage at the output terminal of the buck converter can be reduced below the voltage at the input terminal of the buck converter.

Figure 7:
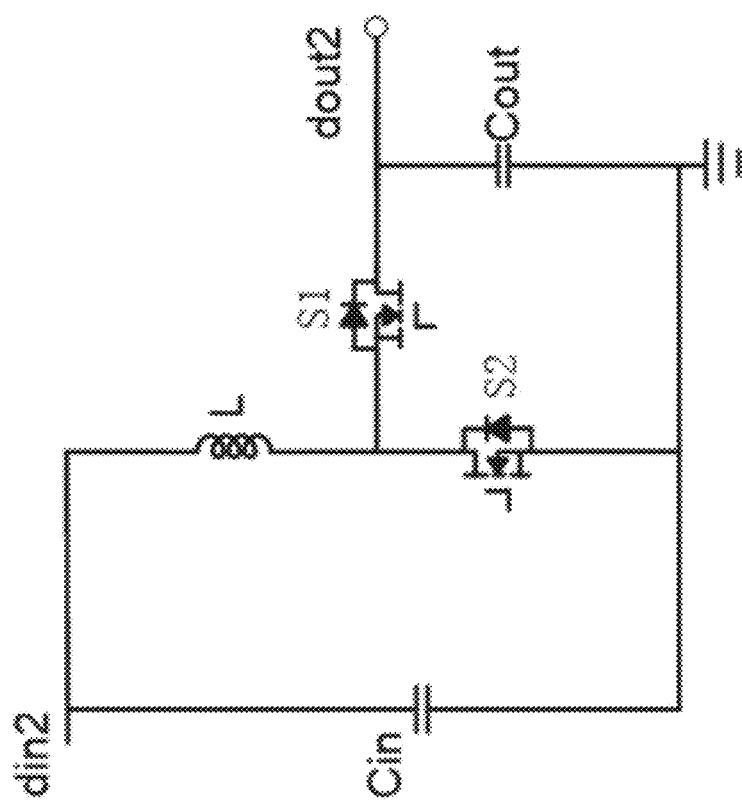
FIG. 7 is a typical boost converter.

Further, in an embodiment of the present invention, the voltage regulating module 500 in the power supply conversion structure shown in FIG. 4 is a boost converter. Further, in response to that the voltage received by the load 200 connected to the output terminal dout2 of the voltage regulating module 500 is reduced below the threshold voltage, the controller 400 controls the switched capacitor converter 100 such that: in response to that the voltage received by the load 200 connected to the output terminal dout2 of the voltage regulating module 500 is reduced below the threshold voltage, the controller 400 controls the switched capacitor converter 100 to operate in a charge pump mode in which a ratio of the voltage at the first terminal d11 of the first switch series branch 110 to the voltage at the power supply output terminal douts is 1:1. Therefore, when the controller 400 controls the switched capacitor converter 100 to operate, the first voltage V1 is the voltage of the battery 300. The voltage received by the input terminal din2 of the boost converter is the voltage of the battery 300. The boost converter operates to boost and regulate the voltage of the battery 300, so that the voltage output from the output terminal dout2 of the voltage regulating module 500 is higher than the voltage of the battery 300 at the moment, and the voltage received by the load 200 is boosted to be higher than the voltage of the battery 300 from the voltage of the battery 300. The voltage received by the load 200 is adjusted back to guarantee that the voltage received by the load of the electronic device is high enough, thus avoiding bad customer experience such as black screen and even shutdown of the electronic device. Further, the voltage regulating module 500 in FIG. 4 may be a typical boost converter. Specifically, please refer to a schematic diagram of a circuit of a typical boost converter shown in FIG. 7. In FIG. 7, a switch S1, a switch S2, an inductor L, an input-side capacitor Cin and an output-side capacitor Cout form the typical boost converter. The specific structure of the boost converter is not limited by the present invention, as long as the voltage at the output terminal of the boost converter can be boosted to be higher than voltage at the input terminal of the boost converter.

Figure 8:
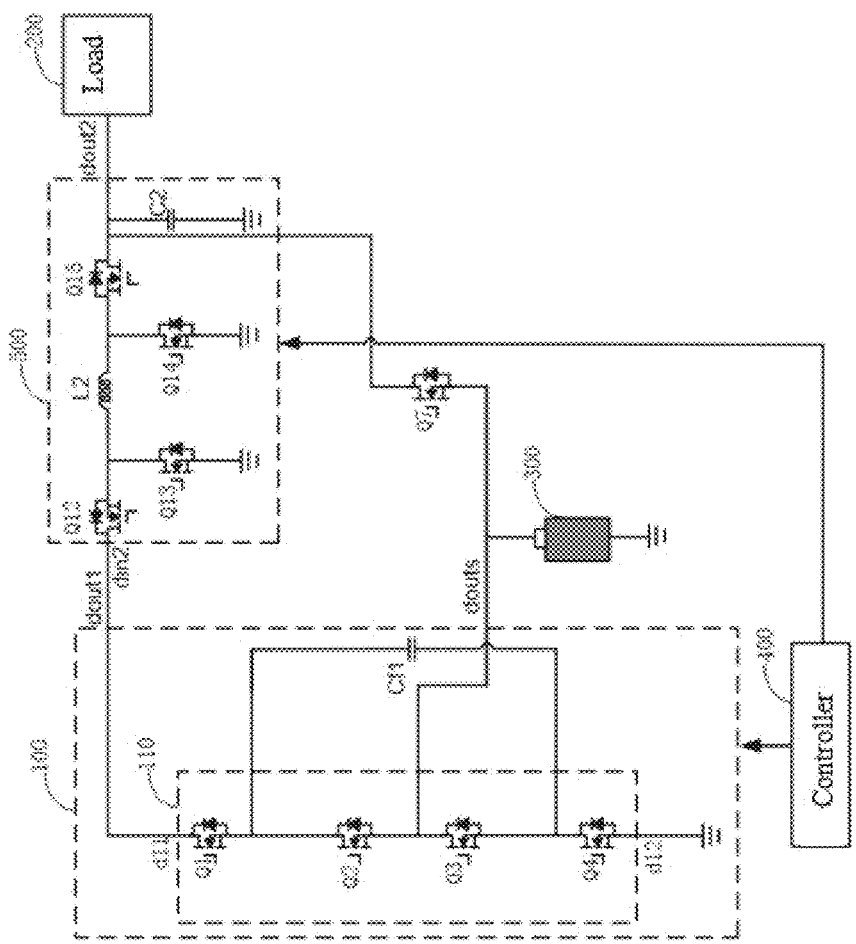
FIG. 8 is a schematic diagram of a circuit of a power supply conversion structure of another embodiment of the present invention.

Further, in an embodiment of the present invention, please refer to a schematic diagram of a circuit of a power supply conversion structure of another embodiment of the present invention shown in FIG. 8. The voltage regulating module 500 in the power supply conversion structure shown in FIG. 4 is a boost-buck converter. The voltage regulating module 500 shown in FIG. 8 comprises a twelfth switch Q12, a thirteenth switch Q13, a fourteenth switch Q14, a fifth switch Q15, a second inductor L2, and a second capacitor C2. The twelfth switch Q12 to the fifteenth switch Q15 each comprises a first terminal, a second terminal and a control terminal. The first terminal of the twelfth switch Q12 forms the input terminal din2 of the voltage regulating module 500 and is connected to the first output terminal dout1 of the switched capacitor converter 100. The second terminal of the twelfth switch Q12 is connected to the first terminal of the thirteenth switch Q13 and a first terminal of the second inductor L2. The second terminal of the thirteenth switch Q13 is grounded. A second terminal of the second inductor L2 is connected to the first terminal of the fourteenth switch Q14 and the second terminal of the fifteenth switch Q15, and the second terminal of the fourteenth switch Q14 is grounded. The first terminal of the fifteenth switch Q15 is connected to a first terminal of the second capacitor C2. A second terminal of the second capacitor C2 is grounded, and the first terminal of the fifteenth switch Q15 is connected to the output terminal dout2 of the voltage regulating module 500. Therefore, the first terminal d11 of the first switch series branch 110 provides the first voltage V1. Further, in response to that the voltage received by the load 200 connected to the output terminal dout2 of the voltage regulating module 500 is reduced below the threshold voltage, the controller 400 controls the switched capacitor converter 100 and the voltage regulating module 500 such that: in response to that the voltage received by the load 200 connected to the output terminal dout2 of the voltage regulating module 500 is reduced below the threshold voltage, the controller 400 controls the switched capacitor converter 100 to operate in a charge pump mode in which a ratio of a voltage at the first terminal d11 of the first switch series branch 110 to a voltage at the power supply output terminal douts is N:1. N is an integer greater than or equal to 2. The controller also controls the voltage regulating module 500 to operate in a buck mode, thus supplying power to the load 200 connected to the output terminal dout2 of the voltage regulating module 500. More specifically, the control of the controller 400 makes the twelfth switch Q12 and the thirteenth switch Q13 be switched between an on state and an off state in a certain frequency. The fifteenth switch Q15 is turned on, and the fourteenth switch Q14 is turned off, so that the voltage regulating module 500 operates in a buck mode. As an example, the switched capacitor converter 100 operates in a charge pump mode in which a ratio of a voltage at the first terminal d11 of the first switch series branch 110 to a voltage at the power supply output terminal douts is 2:1. The voltage received by the input terminal din2 of the voltage regulating module 500 is twice the voltage of the battery. The voltage regulating module 500 operates to step down and regulate the twice the voltage of the battery 300, so that the voltage output from the output terminal dout2 of the voltage regulating module 500 is higher than the voltage of the battery 300 at the moment, and the voltage received by the load 200 is boosted to be higher than the voltage of the battery 300 from the voltage of the battery 300. The voltage received by the load 200 is adjusted back to guarantee that the voltage received by the load of the electronic device is high enough, thus avoiding bad customer experience such as black screen and even shutdown of the electronic device. Further, in another embodiment, in response to that the voltage received by the load 200 connected to the output terminal dout2 of the voltage regulating module 500 is reduced below the threshold voltage, the controller 400 controls the switched capacitor converter 100 and the voltage regulating module 500 such that: in response to that the voltage received by the load 200 connected to the output terminal dout2 of the voltage regulating module 500 is reduced below the threshold voltage, the controller 400 controls the switched capacitor converter 100 to operate in a charge pump mode in which a ratio of the voltage at the first terminal d11 of the first switch series branch 110 to the voltage at the power supply output terminal douts is 1:1. The controller also controls the voltage regulating module 500 to operate in a boost mode, thus supplying power to the load 200 connected to the output terminal dout2 of the voltage regulating module 500. More specifically, the control of the controller 400 makes the fourteenth switch Q14 and the fifth switch Q15 be switched between an on state and an off state in a certain frequency. The twelfth switch Q12 is turned on, and the thirteenth switch Q13 is turned off, so that the voltage regulating module 500 operates in a boost mode. The voltage received by the input terminal din2 of the voltage regulating module 500 is the voltage of battery, and the voltage regulating module 500 operates to boost and regulate the voltage of the battery 300, so that the voltage output from the output terminal dout2 of the voltage regulating module 500 is higher than the voltage of the battery 300 at the moment, and the voltage received by the load 200 is boosted to be higher than the voltage of the battery 300 from the voltage of the battery 300. The voltage received by the load 200 is adjusted back to guarantee that the voltage received by the load of the electronic device is high enough, thus avoiding bad customer experience such as black screen and even shutdown of the electronic device.

Figure 10:
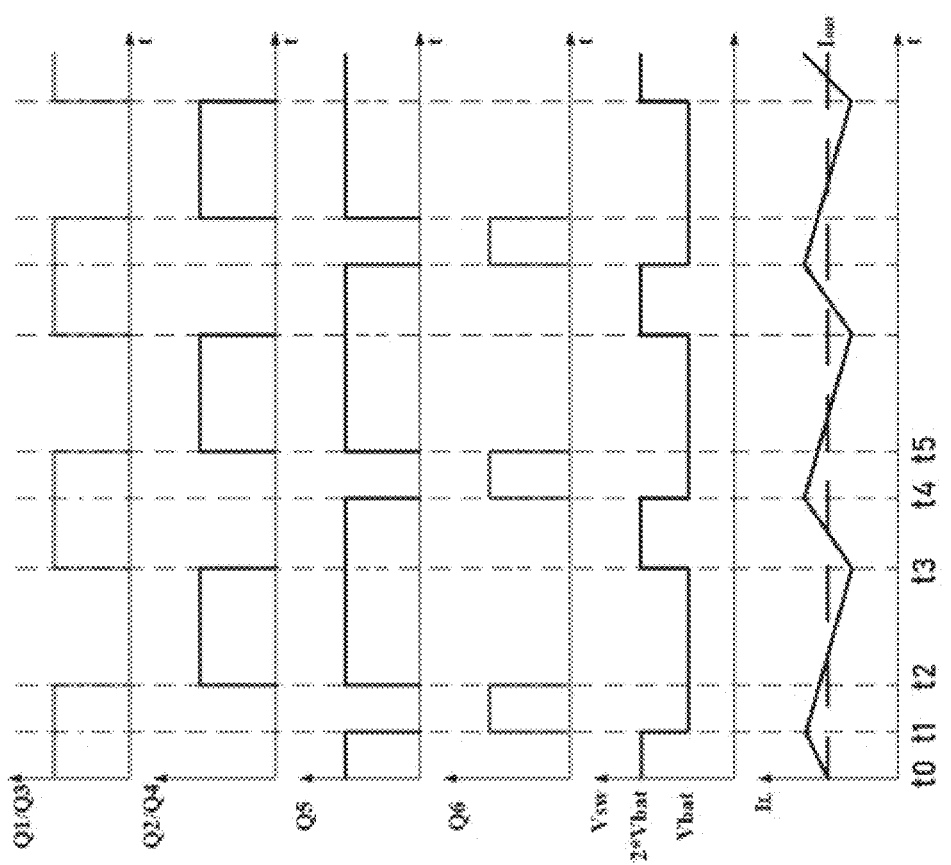
FIG. 10 is a schematic diagram of an operating waveform of a power supply conversion structure of an embodiment of the present invention.
Figure 11A:
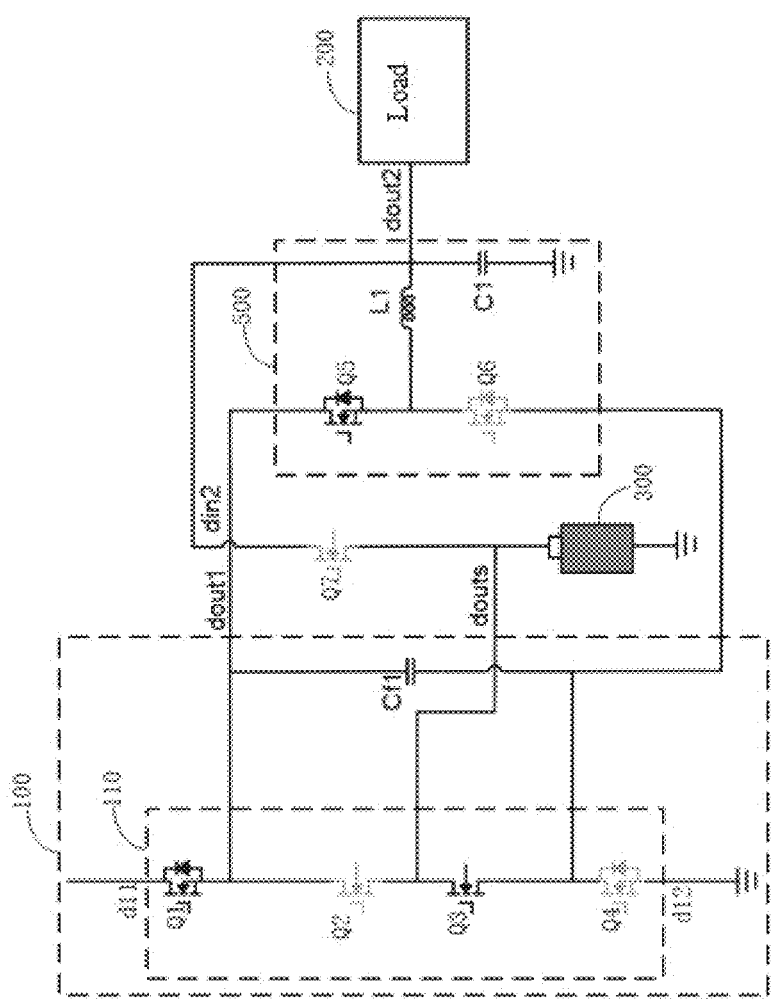
FIG. 11a is a schematic diagram of an operating principle of a first operating stage of a power supply conversion structure of an embodiment of the present invention.
Figure 11B:
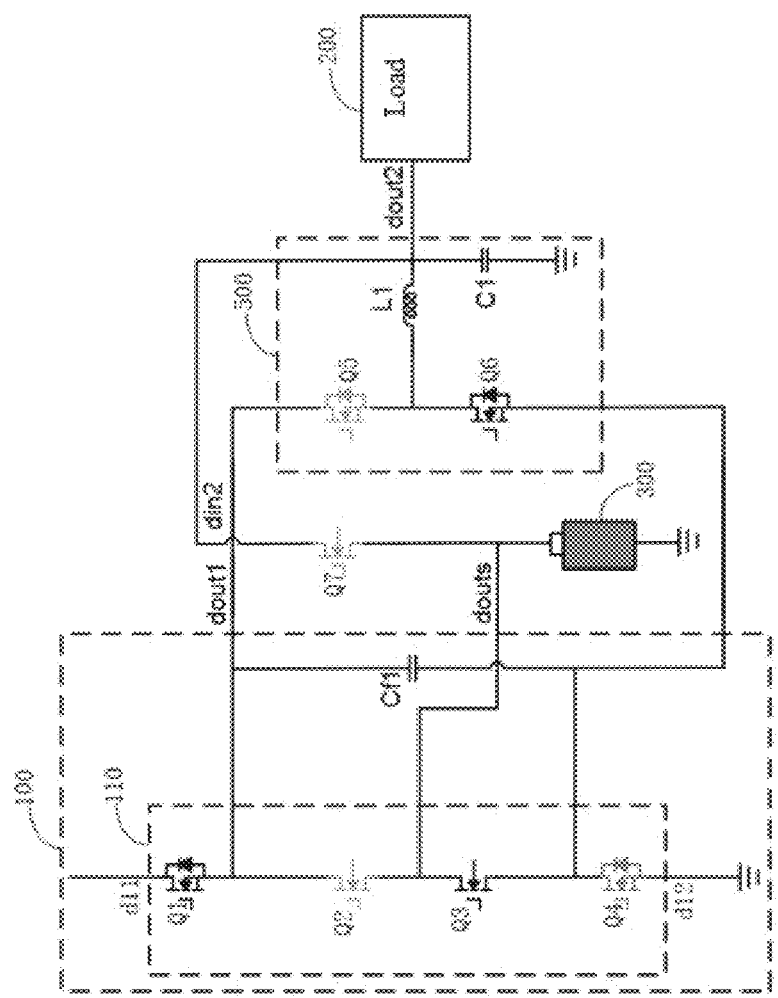
FIG. 11b is a schematic diagram of an operating principle of a second operating stage of a power supply conversion structure of an embodiment of the present invention.
Figure 11C:
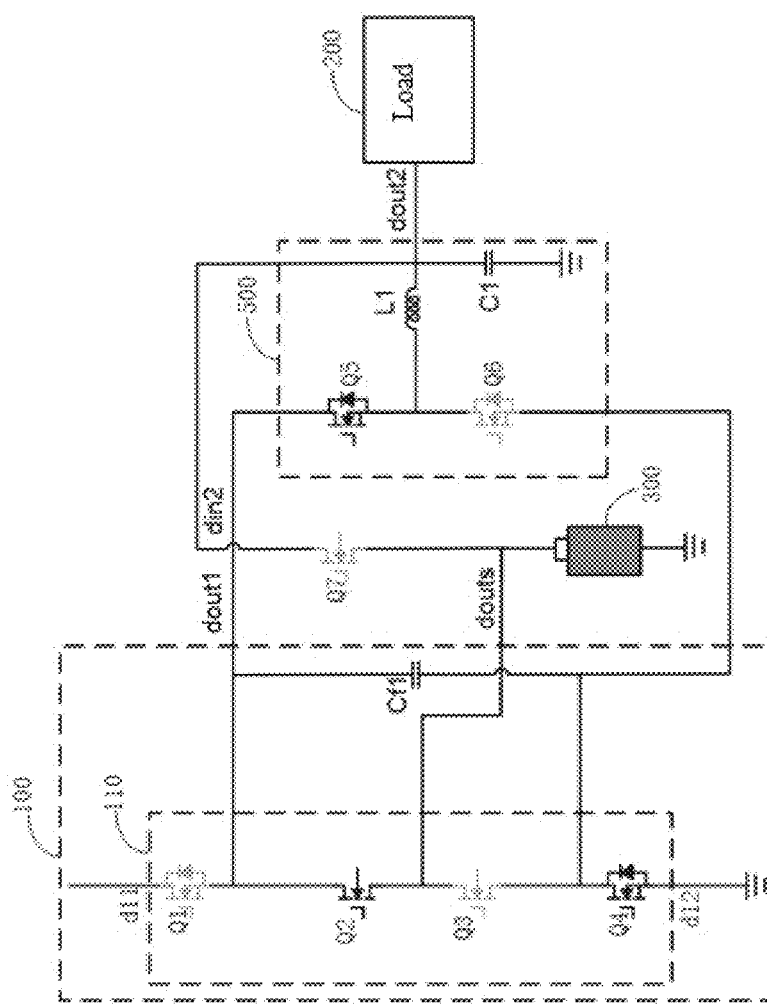
FIG. 11c is a schematic diagram of an operating principle of a third operating stage of a power supply conversion structure of an embodiment of the present invention.

Further, in an embodiment of the present invention, the common node of the first switch Q1 and the second switch Q2 in the switch series branch 110 forms the first output terminal dout1 of the switched capacitor converter 100, and the input terminal din2 of the voltage regulating module 500 is connected to the common node of the first switch Q1 and the second switch Q2. The common node of the first switch Q1 and the second switch Q2 of the first switch series branch 110 provides the first voltage V1. Further, please refer to a schematic diagram of a circuit of a power supply conversion structure of another embodiment of the present invention shown in FIG. 9. The voltage regulating module 500 comprises a fifth switch Q5, a sixth switch Q6, a first inductor L1 and a first capacitor C1. The fifth switch Q5 and the sixth switch Q6 each comprises a first terminal, a second terminal, and a control terminal. The first terminal of the fifth switch Q5 forms the input terminal din2 of the voltage regulating module 500 and is connected to the common node of the first switch Q1 and the second switch Q2, which is the first output terminal dout1 of the switched capacitor converter 100. The second terminal of the fifth switch Q5 is connected to the first terminal of the first inductor L1 and the first terminal of the sixth switch Q6. A second terminal of the first inductor L1 is connected to a first terminal of the first capacitor C1. A second terminal of the first capacitor C1 is grounded. The second terminal of the first inductor L1 is connected to the output terminal dout2 of the voltage regulating module 500. The second terminal of the sixth switch Q6 is connected to the common node of the third switch Q3 and the fourth switch Q4. The control terminals of the fifth switch Q5 and the sixth switch Q6 are configured to receive a switch control signal. Therefore, the input terminal din2 of the voltage regulating module 500 is connected to the common node of the first switch Q1 and the second switch Q2. The common node of the first switch Q1 and the second switch Q2 of the switched capacitor converter 100 provides the first voltage V1. Further, in response to that the voltage received by the load 200 connected to the output terminal dout2 of the voltage regulating module 500 is reduced below the threshold voltage, the controller 400 controls the switched capacitor converter 100 and the voltage regulating module 500 such that: in response to that the voltage received by the load 200 connected to the output terminal dout2 of the voltage regulating module 500 is reduced below the threshold voltage, the controller 400 controls the switched capacitor converter 100 to operate in a charge pump mode in which a ratio of the voltage at the first terminal d11 of the first switch series branch 110 to the voltage at the power supply output terminal douts is N:1. N is an integer greater than or equal to 2. The controller also controls the fifth switch Q5 and the sixth switch Q6 to supply power to the load 200 connected to the output terminal dout2 of the voltage regulating module 500. The operation of the fifth switch Q5 and the sixth switch Q6 means that the fifth switch Q5 and the sixth switch Q6 are switched between an on state and an off state in a certain frequency. To explain the principle by taking N equal to 2 as an example, specifically, please refer to a diagram of operating waveforms of a power supply conversion structure of an embodiment of the present invention shown in FIG. 10. The horizontal axis is time t. The vertical axis is a switch control signal SC. Firstly, at the t0 time, the first switch Q1, the third switch Q3 and the fifth switch Q5 are turned on, and the fourth switch Q4 and the sixth switch Q6 are turned off, so that the first flying capacitor Cf1 is subjected to discharging, and the first inductor L1 stores energy. The current IL of the first inductor L1 is increased, and the voltage at the first terminal of the first inductor L1 is twice the voltage of the battery 300. Specifically, it can be referred to a schematic diagram of an operating principle at a first operating stage of the power supply conversion structure of an embodiment of the present invention shown in FIG. 11a. Then, at the t1 time, the sixth switch Q6 is turned on, and the fifth switch Q5 is turned off. The current flowing through the first inductor L1 continues. The current IL of the first inductor L1 is gradually reduced, and the voltage at the first terminal of the first inductor L1 is the voltage of the battery 300. Specifically, it can be referred to a schematic diagram of an operating principle at the second operating state of the power supply conversion structure of an embodiment of the present invention as shown in FIG. 11b. Then, at the t2 time, the first switch Q1, the third switch Q3 and the sixth switch Q6 are turned off, and the second switch Q2, the fourth switch Q4 and the fifth switch Q5 are turned on. The first flying capacitor Cf1 is subjected to charging. The current flowing through the first inductor L1 continues. The current IL of the first inductor L1 is gradually reduced, and the voltage at the first terminal of the first inductor L1 is the voltage of the battery 300. Specifically, it can be referred to a schematic diagram of an operating principle at the third operating stage of the power supply conversion structure of an embodiment of the present invention shown in FIG. 11c. At the t3 time, the power supply conversion structure enters the next switching cycle, thus regulating the voltage at the first terminal of the first inductor L1 (switching between the voltage of the battery and twice the voltage of the battery) to boost the voltage output to the load 200 to be higher than the voltage of the battery from the voltage of the battery. Thus, the bad customer experience such as black screen and even shutdown of the electronic device due to the fact that the voltage received by the load 200 is lower than the threshold voltage is avoided. In the operating process shown in FIG. 10, the first switch Q1, the second switch Q2, the third switch Q3, the fourth switch Q4 and the first flying capacitor Cf1 form the switched capacitor converter, and a ratio of the voltage at the first terminal d11 of the first switch series branch 110 to the voltage at the power supply output terminal douts is 2:1. The voltage at the first terminal of the first inductor L1 can be switched between the battery voltage and twice the voltage of the battery, thus boosting the voltage output to the load 200. In another embodiment, a ratio of the voltage at the first terminal d11 of the first switch series branch 110 to the voltage at the power supply output terminal douts may also be N:1. N is an integer greater than 2. More specifically, in an embodiment, in the operating process shown in FIG. 10, the magnitude of the voltage output from the output terminal dout2 of the voltage regulating module 500 can be regulated by controlling a duty cycle of the fifth switch Q5. Therefore, the voltage output to the load 200 is adjustable. When the duty cycle of the fifth switch Q5 is 1, a filter formed by the first inductor L1 and the first capacitor C1 filters the voltage at the first terminal of the first inductor L1 (switching the voltage between the voltage of the battery and twice the voltage of the battery. If the switched capacitor converter 100 operates in a charge pump mode in which a ratio of the voltage at the first terminal d11 of the first switch series branch 110 to the voltage at the power supply output terminal douts is 2:1), then the voltage at the output terminal dout2 of the voltage regulating module 500 is one and a half times the voltage of the battery. In other words, the voltage output to the load 200 is boosted from the voltage of the battery to one and a half times the voltage of the battery.

As described above, in an embodiment, in response to that the voltage received by the load connected to the output terminal of the voltage regulating module is reduced below the threshold voltage, the controller controls the switched capacitor converter and the voltage regulating module such that: in response to that the voltage received by the load connected to the output terminal of the voltage regulating module is reduced below the threshold voltage, the controller controls the switched capacitor converter to operate in a charge pump mode, and controls at least one switch in the voltage regulating module to regulate the first voltage V1.

In an embodiment of practical application, when the electronic device is usually in the first state (the battery 300 needs to be charged, at the moment), the switched capacitor converter 100 receives an input voltage Vin. The power supply conversion structure operates to charge the battery 300 and supplies power to the load 200. Specifically, in the first state, the controller 400 is further configured to control the switched capacitor converter 100 and the voltage regulating module 500 to operate cooperatively or to control the voltage regulating module 500 to operate, thus supplying power to the load 200 connected to the output terminal dout2 of the voltage regulating module 500 and charging the battery 300 connected to the power supply output terminal douts of the switched capacitor converter 100. This is the first operating mode. Alternatively, the controller is configured to control the switched capacitor converter 100 to operate in a charge pump mode, thus supplying power to the load 200 connected to the output terminal dout2 of the voltage regulating module 500 and charging the battery 300 connected to the power supply output terminal douts of the switched capacitor converter 100. This is the second operating mode. Alternatively, the controller is configured to control the switched capacitor converter 100 and the voltage regulating module 500 to operate cooperatively or to control the voltage regulating module 500 to operate, thus supplying power to the load 200 connected to the output terminal dout2 of the voltage regulating module 500. This is the third operating mode.

Figure 9:
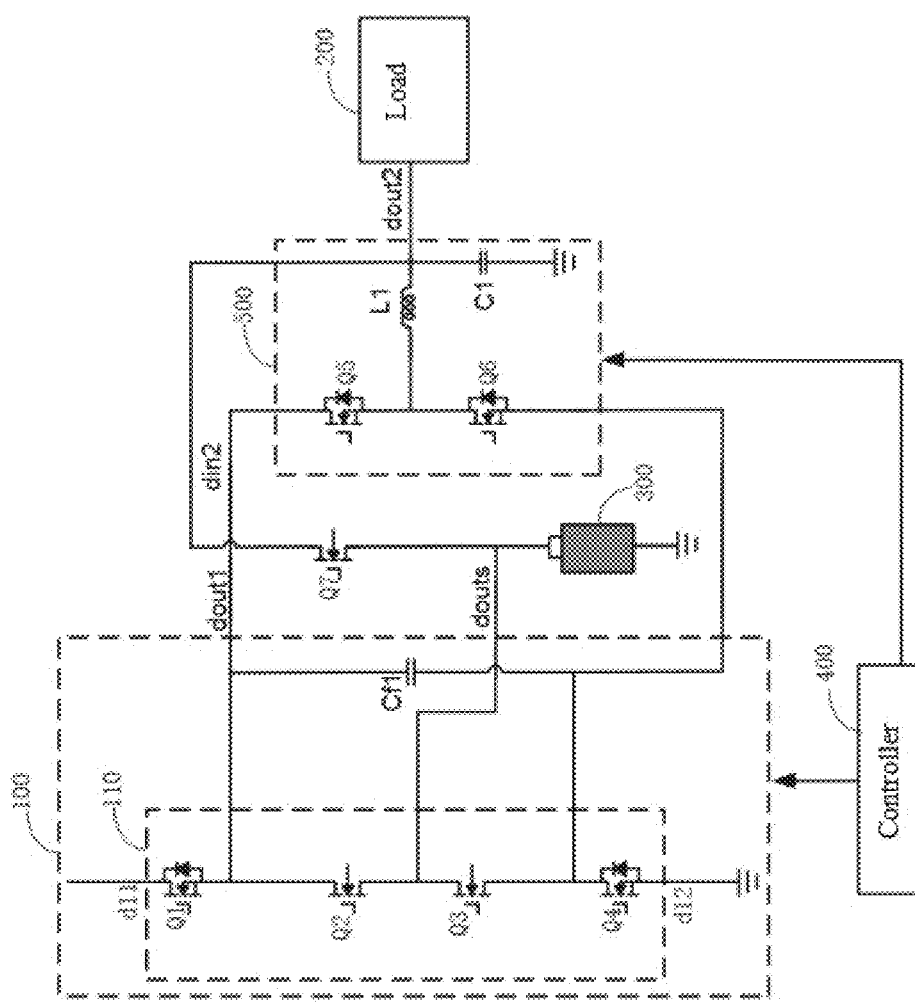
FIG. 9 is a schematic diagram of a circuit of a power supply conversion structure of another embodiment of the present invention.

For the first operating mode, when the power supply conversion structure is as shown in FIG. 9, more specifically, the controller 400 controls the seventh switch Q7 to be in a saturation state or a complete turn-on state, controls the second switch Q2 and the third switch Q3 to be turned off, and controls the first switch Q1, the fourth switch Q4, the fifth switch Q5 and the sixth switch Q6 to operate, thus supplying power to the load 200 connected to the output terminal dout2 and charging the battery 300. In other words, the controller controls the switched capacitor converter 100 and the voltage regulating module 500 to operate cooperatively in a three-level buck converter mode. The voltage regulating module 500 is the buck converter, the boost converter or the one as shown in FIG. 8. More specifically, the controller 400 controls the seventh switch Q7 to be turned on and controls the voltage regulating module 500 to operate, thus supplying power to the load 200 connected to the output terminal dout2 and charging the battery 300. In other words, the voltage regulating module 500 operates. In the first operating mode, the battery 300 is subjected to trickle charge, pre-charge and constant-voltage charge.

For the second operating mode, the controller 400 controls the switched capacitor converter 100 to operate in a charge pump mode, thus supplying power to the load 200 connected to the output terminal dout2 of the voltage regulating module 500 and charging the battery 300 connected to the power supply output terminal douts of the switched capacitor converter 100. In the second operating mode, the battery 300 is subjected to constant-voltage charge.

For the third operating mode, the power supply conversion structure is configured as the structure shown in FIG. 9. More specifically, the controller 400 controls the seventh switch Q7 to be turned off, controls the second switch Q2 and the third switch Q3 to be turned off, and controls the first switch Q1, the fourth switch Q4, the fifth switch Q5 and the sixth switch Q6 to operate, thus supplying power to the load 200 connected to the output terminal dout2. In other words, the controller controls the switched capacitor converter 100 and the voltage regulating module 500 to operate cooperatively in the three-level buck converter mode. The voltage regulating module 500 is the buck converter, the boost converter or the one shown in FIG. 8, more specifically, the controller 400 controls the seventh switch Q7 to be turned off, and controls the voltage regulating module 500 to operate, thus supplying power to the load 200 connected to the output terminal dout2. In other words, the voltage regulating module 500 operates. In the third operating mode, the seventh switch Q7 is turned off, and the battery is in a discharge state.

The cooperative operation of the switched capacitor converter 100 and the voltage regulating module 500 refers that at least one switch in the switched capacitor converter 100 and at least one switch in the voltage regulating module 500 are switched between an on state and an off state in a certain frequency.

As described above, when the electronic device is in the first state, the switched capacitor converter 100 and the voltage regulating module 500 operate to charge the battery 300 and supply power to the load 200. When the electronic device is in the second state, and in response to that the voltage received by the load 200 connected to the output terminal dout2 of the voltage regulating module 500 is reduced below the threshold voltage, the switched capacitor converter 100 and the voltage regulating module 500 operate to adjust back the voltage output to the load 200. That is, in the voltage adjust-back mode, the voltage regulating module 500 reuses the components in the power supply conversion structure without adding devices to implement the voltage adjust-back function. Therefore, the power supply conversion structure of the present application can achieve high efficiency in the full charge process of the battery 300 while supplying power to the load, and bad customer experience such as black screen and even shutdown of the electronic device due to the fact that the voltage received by the load 200 is lower than the threshold voltage can be avoided, thus achieving stable and reliable operation of the electronic device.

Furthermore, the power supply conversion structure further comprises a seventh switch Q7. The seventh switch Q7 comprises a first terminal, a second terminal, and a control terminal. The first terminal of the seventh switch Q7 is connected to the output terminal dout2 of the voltage regulating module 500. The second terminal of the seventh switch Q7 is connected to the power supply output terminal douts of the switched capacitor converter 100, and the control terminal of the seventh switch Q7 is configured to receive a switch control signal. In response to that the voltage received by the load 200 connected to the output terminal dout2 of the voltage regulating module 500 is reduced below the threshold voltage, the controller 400 controls the switched capacitor converter 100 and the voltage regulating module 500 to operate, and further controls the seventh switch Q7 to be turned off. That is, the previous mode of supplying power to the load 200 by the battery 300 is changed into a mode of supplying power to the load 200 by the power supply conversion structure formed by the switched capacitor converter 100 and the voltage regulating module 500. Furthermore, when the seventh switch Q7 is configured to be turned on to supply power to the load 200, the charge to the battery 300 is achieved. Alternatively, the battery 300 is configured to supply power to the load 200. The seventh switch Q7 is configured to be turned off to supply power only to the load 200. In other words, the seventh switch Q7 can achieve a power path management function.

For the power supply conversion structure shown in FIG. 9, in an embodiment in practical application, when the second switch Q2 and the third switch Q3 are in an off state, it is expected that the second switch Q2 and the third switch Q3 can be completely turned off. In the embodiments above, the parasitic diodes which are back-to-back connected in series are connected in parallel to the two terminals of the second switch Q2 and the third switch Q3. Specifically, by taking the second switch Q2 as an example, anodes of the two diodes are connected together. A cathode of one diode is connected with the first terminal of the second switch Q2, and a cathode of the other diode is connected to the second terminal of the second switch Q2, thus making the two diodes be back-to-back connected in series. The third switch Q3 has the same structure as the second switch Q2. As such, unnecessary details are not given here. Furthermore, in an embodiment in the practical application, a turn-off scenario exists when the seventh switch Q7 is in the off state (e.g., a ship mode). In other words, the seventh switch Q7 may have the same structure as the second switch Q2. In another embodiment in the practical application, a substrate of the second switch Q2 is connected to a first selective switch. The substrate of the third switch Q3 is connected to a second selective switch. When operating in a charge pump mode, the first selective switch is connected to a source electrode of the second switch Q2 (taking MOSFET as an example). When operating in a three-level buck converter mode, the first selective switch is connected to an offset voltage to make the second switch Q2 be completely turned off. Similarly, when operating in a switched capacitor converter mode, the second selective switch is connected to a source electrode of the third switch Q3 (by taking the MOSFET as an example). When operating in a three-level buck converter mode, the second selective switch is connected to an offset voltage to make the third switch Q3 be completely turned off. In an embodiment of the present application, the offset voltage is less than the voltage of the battery 300. In an embodiment of the present application, a substrate of the seventh switch Q7 is also led out.

Figure 12:
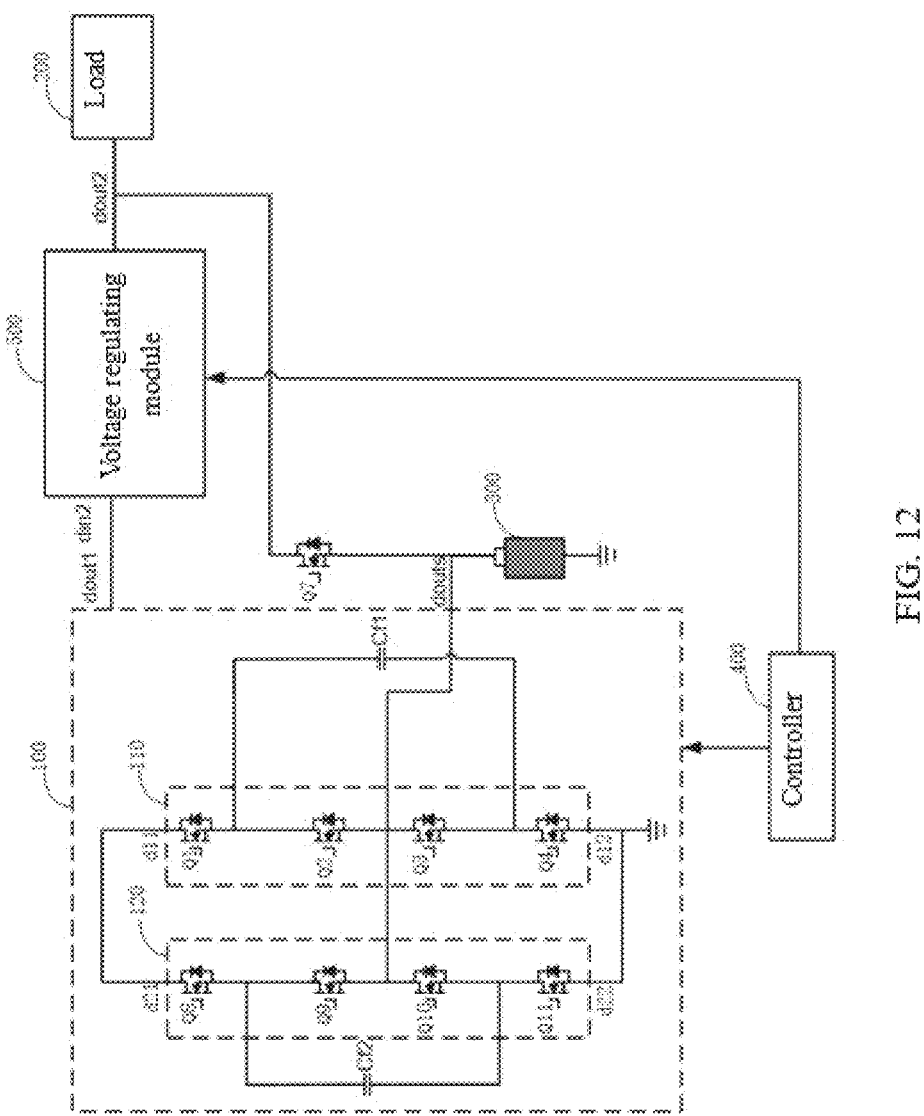
FIG. 12 is a schematic diagram of a circuit of a power supply conversion structure of another embodiment of the present invention.

Furthermore, in an embodiment of the present invention, please refer to a schematic diagram of a circuit of a power supply conversion structure of another embodiment of the present invention shown in FIG. 12. Based on the power supply conversion structure shown in FIG. 3, the power supply conversion structure further comprises a second flying capacitor Cf2 and a second switch series branch 120. The second switch series branch 120 comprises an eighth switch Q8, a ninth switch Q9, a tenth switch Q10 and an eleventh switch Q11 connected in series. A first terminal of the eighth switch Q8 forms a first terminal of the second switch series branch 120 and is connected to the first terminal d21 of the first switch series branch 110. A second terminal of the eleventh switch Q11 forms a second terminal d22 of the second switch series branch 120 and is connected to the second terminal d12 of the first switch series branch 110. A common node of the eighth switch Q8 and the ninth switch Q9 is connected to a first terminal of the second flying capacitor Cf2. A common node of the tenth switch Q10 and the eleventh switch Q11 is connected to a second terminal of the second flying capacitor Cf2, and a common node of the ninth switch Q9 and the tenth switch Q10 is connected to the common node of the second switch Q2 and the third switch Q3. The first switch Q1, the second switch Q2, the third switch Q3, the fourth switch Q4 and the first flying capacitor Cf1 form a first phase switched capacitor converter. The eighth switch Q8, the ninth switch Q9, the tenth switch Q10, the eleventh switch Q11 and the second flying capacitor Cf2 form a second phase switched capacitor converter. FIG. 12 shows a dual-phase switched capacitor converter, and the power level of the power supply conversion structure is further improved. Certainly, in an embodiment of the present application, the power supply conversion structure may comprise n second phase switched capacitor converters as shown in FIG. 12 connected in parallel. In some embodiments, n is a positive integer, thus achieving an (n+1)-phase switched capacitor converter. FIG. 12 illustrates the principle with two phases only.

In an embodiment of the present invention, the switches each comprises a control terminal for controlling a switch control signal output by the controller 400, thus being in an on state or off state.

In an embodiment of the present invention, each of the switches is a MOSFET, including a source, a drain, and a gate. The first terminal of each switch is the drain. The second terminal of the switch is the source. The control terminal is the gate. The control terminal is configured to receive a switch control signal.

In an embodiment of the present invention, the switch may also be a bipolar junction transistor, a super-junction transistor, an insulated gate bipolar transistor, a GaN-based power device, and/or a similar device. If a device in the industry can be turned on or turned off by receiving a switch control signal, this device is acceptable.

In an embodiment of the present invention, the switches each comprise a single switch as an example. In the practical application, each switch may comprise a plurality of switches connected in series and/or in parallel.

As described above, the example that the first terminal d11 of the switch series branch 110 forms the first output terminal dout1 of the switched capacitor converter 100 and the common node of the first switch Q1 and the second switch Q2 in the switch series branch 110 forms the first output terminal dout1 of the switched capacitor converter 100 to provide the first voltage V1 is illustrated. In the embodiments of the practical application, any node capable of providing a voltage in the switched capacitor converter 100 can be used as the first output terminal dout1 of the switched capacitor converter 100, which is not limited in the present application.

In an embodiment of the present invention, an electronic device 10 is further provided. The electronic device 10 may be portable devices (including cell phones, tablet computers, digital cameras, MP3 players and/or other similar electronic devices). Specifically, please refer to a schematic diagram of a power supply conversion system of an embodiment of the present invention shown in FIG. 2. The electronic device 10 comprises the power supply conversion structure, the battery 300 and the load 200. The first terminal of the battery 300 is connected to the power supply output terminal douts of the switched capacitor converter 100, and the second terminal of the battery 300 is grounded. The load 200 is connected to the output terminal dout2 of the voltage regulating module 500.

In an embodiment, the load 200 may be a power consumption unit of an electronic device, such as the power consumption unit of portable devices (including cell phones, tablet computers, digital cameras, MP3 players and/or other similar electronic devices). In an embodiment, the battery 300 may be a chargeable battery in the electronic device, such as chargeable batteries in the portable devices (including cell phones, tablet computers, digital cameras, MP3 players and/or other similar electronic devices).

Finally, it should be noted that the above embodiments are only used to illustrate the technical solution of the present invention rather than limiting. Although the present invention has been described in detail with reference to the foregoing embodiments, it will be appreciated by those of ordinary skill in the art that the technical solutions described in the foregoing embodiments can still be modified or part or all of the technical features thereof can be equivalently replaced; and these modifications or replacements do not make the essence of the corresponding technical solution deviate from the scope of the technical solution of each embodiment of the present invention.

What is claimed is:

1. A power supply conversion structure comprising:
    a switched capacitor converter comprising at least one switch, a power supply output terminal, and a first output terminal, wherein the switched capacitor converter is configured to convert a voltage of a battery connected to the power supply output terminal of the switched capacitor converter into a first voltage, and the first voltage is output from the first output terminal of the switched capacitor converter;
    a voltage regulating module comprising at least one switch, an input terminal, and an output terminal, wherein the input terminal of the voltage regulating module is connected to the first output terminal of the switched capacitor converter and is configured to receive the first voltage and convert the first voltage into a second voltage, and the second voltage is output from the output terminal of the voltage regulating module; and
    a controller connected to the switched capacitor converter and the voltage regulating module, and configured to control switches in the switched capacitor converter and the voltage regulating module, wherein in a process that the battery connected to the power supply output terminal of the switched capacitor converter supplies power to a load connected to the output terminal of the voltage regulating module, in response to that a voltage received by the load connected to the output terminal of the voltage regulating module is reduced below a threshold voltage, the controller controls the switched capacitor converter and the voltage regulating module to convert the first voltage to the second voltage, and wherein the second voltage is higher than the voltage of the battery connected to the power supply output terminal of the switched capacitor converter.

2. The power supply conversion structure according to claim 1, wherein:
    the switched capacitor converter is a charge pump converter.

3. The power supply conversion structure according to claim 1, wherein:
    the threshold voltage is greater than or equal to 3.3 V, and less than or equal to 3.8 V.

4. The power supply conversion structure according to claim 1, wherein:
the switched capacitor converter comprises a first switch series branch and a first flying capacitor;
the first switch series branch comprises a first switch, a second switch, a third switch and a fourth switch connected in series;
a first terminal of the first switch forms a first terminal of the first switch series branch, and a second terminal of the fourth switch forms a second terminal of the first switch series branch;
the second terminal of the first switch series branch is grounded;
a common node of the first switch and the second switch is connected to a first terminal of the first flying capacitor;
a common node of the third switch and the fourth switch is connected to a second terminal of the first flying capacitor; and
a common node of the second switch and the third switch is connected to the power supply output terminal of the switched capacitor converter.

5. The power supply conversion structure according to claim 4, wherein:
the first terminal of the first switch series branch forms the first output terminal of the switched capacitor converter.

6. The power supply conversion structure according to claim 5, wherein:
the voltage regulating module is a buck converter, and wherein in response to that the voltage received by the load connected to the output terminal of the voltage regulating module is reduced below the threshold voltage, the controller controls the switched capacitor converter such that:
in response to that the voltage received by the load connected to the output terminal of the voltage regulating module is reduced below the threshold voltage, the controller controls the switched capacitor converter to operate in a charge pump mode in which a ratio of the voltage at the first terminal of the first switch series branch to the voltage at the power supply output terminal is N:1, and wherein N is an integer greater than or equal to 2.

7. The power supply conversion structure according to claim 5, wherein:
the voltage regulating module is a boost converter, and wherein in response to that the voltage received by the load connected to the output terminal of the voltage regulating module is reduced below the threshold voltage, the controller controls the switched capacitor converter such that:
in response to that the voltage received by the load connected to the output terminal of the voltage regulating module is reduced below the threshold voltage, the controller controls the switched capacitor converter to operate in a charge pump mode in which a ratio of the voltage at the first terminal of the first switch series branch to the voltage at the power supply output terminal is 1:1.

8. The power supply conversion structure according to claim 5, wherein:
the voltage regulating module comprises a twelfth switch, a thirteenth switch, a fourteenth switch, a fifteenth switch, a second inductor, and a second capacitor;
the twelfth switch to the fifteenth switch each comprises a first terminal, a second terminal, and a control terminal;
the first terminal of the twelfth switch forms an input terminal of the voltage regulating module;
the second terminal of the twelfth switch is connected to the first terminal of the thirteenth switch and the first terminal of the second inductor;
the second terminal of the thirteenth switch is grounded;
the second terminal of the second inductor is connected to the first terminal of the fourteenth switch and the second terminal of the fifteenth switch;
the second terminal of the fourteenth switch is grounded;
the first terminal of the fifteenth switch is connected to the first terminal of the second capacitor;
the second terminal of the second capacitor is grounded; and
the first terminal of the fifteenth switch is connected to the output terminal of the voltage regulating module.

9. The power supply conversion structure according to claim 8, wherein:
in response to that the voltage received by the load connected to the output terminal of the voltage regulating module is reduced below the threshold voltage, the controller controls the switched capacitor converter and the voltage regulating module such that:
in response to that the voltage received by the load connected to the output terminal of the voltage regulating module is reduced below the threshold voltage, the controller controls the switched capacitor converter to operate in a charge pump mode in which a ratio of the voltage at the first terminal of the first switch series branch to the voltage at the power supply output terminal is N:1, and wherein N is an integer greater than or equal to 2, and wherein the controller controls the voltage regulating module to operate in a buck mode.

10. The power supply conversion structure according to claim 8, wherein:
in response to that the voltage received by the load connected to the output terminal of the voltage regulating module is reduced below the threshold voltage, the controller controls the switched capacitor converter and the voltage regulating module such that:
in response to that the voltage received by the load connected to the output terminal of the voltage regulating module is reduced below the threshold voltage, the controller controls the switched capacitor converter to operate in a charge pump mode in which a ratio of the voltage at the first terminal of the first switch series branch to the voltage at the power supply output terminal is 1:1, and wherein the controller controls the voltage regulating module to operate in a boost mode.

11. The power supply conversion structure according to claim 1, wherein:
the switched capacitor converter comprises a first switch series branch and a first flying capacitor;
the first switch series branch comprises a first switch, a second switch, a third switch and a fourth switch connected in series;
a first terminal of the first switch forms a first terminal of the first switch series branch, and a second terminal of the fourth switch forms a second terminal of the first switch series branch;
the second terminal of the first switch series branch is grounded;

a common node of the first switch and the second switch is connected to a first terminal of the first flying capacitor;

a common node of the third switch and the fourth switch is connected to a second terminal of the first flying capacitor; and a common node of the second switch and the third switch is connected to the power supply output terminal of the switched capacitor converter, and wherein:

the voltage regulating module comprises a fifth switch and a sixth switch, a first inductor and a first capacitor;

the fifth switch and the sixth switch each comprises a first terminal, a second terminal, and a control terminal;

the first terminal of the fifth switch forms the input terminal of the voltage regulating module and is connected to the common node of the first switch and the second switch;

the second terminal of the fifth switch is connected to the first terminal of the first inductor and the first terminal of the sixth switch;

the second terminal of the first inductor is connected to the first terminal of the first capacitor;

the second terminal of the first capacitor is grounded;

the second terminal of the first inductor is connected to the output terminal of the voltage regulating module;

the second terminal of the sixth switch is connected to the common node of the third switch and the fourth switch; and the control terminals of the fifth switch and the sixth switch are configured to receive a switch control signal.

12. The power supply conversion structure according to claim 11, wherein:

in response to that the voltage received by the load connected to the output terminal of the voltage regulating module is reduced below the threshold voltage, the controller controls the switched capacitor converter and the voltage regulating module such that:

in response to that the voltage received by the load connected to the output terminal of the voltage regulating module is reduced below the threshold voltage, the controller controls the switched capacitor converter to operate in a charge pump mode in which a ratio of the voltage at the first terminal of the first switch series branch to the voltage at the power supply output terminal is N:1, and wherein N is an integer greater than or equal to 2, and the controller controls the fifth switch and the sixth switch to operate.

13. The power supply conversion structure according to claim 12, wherein:

a voltage level of a voltage output by the output terminal of the voltage regulating module is regulated through controlling a duty cycle of the fifth switch.

14. The power supply conversion structure according to claim 1, wherein:

the power supply conversion structure comprises a seventh switch;

the seventh switch comprises a first terminal, a second terminal, and a control terminal;

the first terminal of the seventh switch is connected to the output terminal of the voltage regulating module;

the second terminal of the seventh switch is connected to the power supply output terminal of the switched capacitor converter; and the control terminal of the seventh switch is configured to receive a switch control signal, and wherein in response to that the voltage received by the load connected to the output terminal of the voltage regulating module is reduced below the threshold voltage, the controller controls the switched capacitor converter to operate and controls the voltage regulating module to operate, and further controls the on and off of the seventh switch.

15. The power supply conversion structure according to claim 1, wherein:

the switched capacitor converter comprises a first switch series branch and a first flying capacitor;

the first switch series branch comprises a first switch, a second switch, a third switch and a fourth switch connected in series;

a first terminal of the first switch forms a first terminal of the first switch series branch, and a second terminal of the fourth switch forms a second terminal of the first switch series branch;

the second terminal of the first switch series branch is grounded;

a common node of the first switch and the second switch is connected to a first terminal of the first flying capacitor;

a common node of the third switch and the fourth switch is connected to a second terminal of the first flying capacitor; and a common node of the second switch and the third switch is connected to the power supply output terminal of the switched capacitor converter, and wherein the switched capacitor converter further comprises:

a second flying capacitor and a second switch series branch;

the second switch series branch comprises an eighth switch, a ninth switch, a tenth switch and an eleventh switch connected in series;

a first terminal of the eighth switch forms a first terminal of the second switch series branch and is connected to the first terminal of the first switch series branch;

a second terminal of the eleventh switch forms a second terminal of the second switch series branch and is connected to the second terminal of the first switch branch series;

a common node of the eighth switch and the ninth switch is connected to a first terminal of the second flying capacitor;

a common node of the tenth switch and the eleventh switch is connected to a second terminal of the second flying capacitor; and a common node of the ninth switch and the tenth switch is connected to the common node of the second switch and the third switch.

16. The power supply conversion structure according to claim 1, wherein when the switched capacitor converter receives an input voltage, the controller is further configured:

to control the switched capacitor converter and the voltage regulating module to operate cooperatively or to control the voltage regulating module to operate, thus supplying power to the load connected to the output terminal of the voltage regulating module, and charging the battery connected to the power supply output terminal of the switched capacitor converter; or to control the switched capacitor converter to operate in a charge pump mode, thus supplying power to the load connected to the output terminal of the voltage regulating module, and charging the battery connected to the power supply output terminal of the switched capacitor converter; or to control the switched capacitor converter and the voltage regulating module to operate cooperatively, or to control the voltage regulating module to operate, thus supplying power to the load connected to the output terminal of the voltage regulating module.

17. An electronic device comprising:

a power supply conversion structure comprising:
- a switched capacitor converter comprising at least one switch, a power supply output terminal, and a first output terminal, wherein the switched capacitor converter is configured to convert a voltage of a battery connected to the power supply output terminal of the switched capacitor converter into a first voltage, and the first voltage is output from the first output terminal of the switched capacitor converter;
- a voltage regulating module comprising at least one switch, an input terminal, and an output terminal, wherein the input terminal of the voltage regulating module is connected to the first output terminal of the switched capacitor converter and is configured to receive the first voltage and convert the first voltage into a second voltage, and the second voltage is output from the output terminal of the voltage regulating module; and
- a controller connected to the switched capacitor converter and the voltage regulating module, and configured to control switches in the switched capacitor converter and the voltage regulating module, wherein in a process that the battery connected to the power supply output terminal of the switched capacitor converter supplies power to a load connected to the output terminal of the voltage regulating module, in response to that a voltage received by the load connected to the output terminal of the voltage regulating module is reduced below a threshold voltage, the controller controls the switched capacitor converter and the voltage regulating module to convert the first voltage to the second voltage, and wherein the second voltage is higher than the voltage of the battery connected to the power supply output terminal of the switched capacitor converter;

the battery, wherein a first terminal of the battery is connected to the power supply output terminal of the switched capacitor converter, and a second terminal of the battery is grounded; and the load connected to the output terminal of the voltage regulating module.

* * * * *